United States Patent
Kulp et al.

(10) Patent No.: US 7,331,042 B2
(45) Date of Patent: Feb. 12, 2008

(54) FAULT-TOLERANT DYNAMIC EDITING OF GUI DISPLAY AND SOURCE CODE

(75) Inventors: Richard L. Kulp, Cary, NC (US); Gili Mendal, Cary, NC (US); L. Scott Rich, Cary, NC (US); Gunturi Srimanth, Morrisville, NC (US); Peter A. Walker, Fuquay Varina, NC (US); Joseph R. Winchester, Otterbourne (GB)

(73) Assignee: International Business Machines Corporation, Armonk, NY (US)

( * ) Notice: Subject to any disclaimer, the term of this patent is extended or adjusted under 35 U.S.C. 154(b) by 755 days.

(21) Appl. No.: 10/327,378

(22) Filed: Dec. 21, 2002

(65) Prior Publication Data

US 2004/0123186 A1 Jun. 24, 2004

(51) Int. Cl.
G06F 9/45 (2006.01)
(52) U.S. Cl. .................................. 717/140; 717/106
(58) Field of Classification Search ............ 714/10–57, 714/758, 2; 715/700, 781; 717/106–143
See application file for complete search history.

(56) References Cited

U.S. PATENT DOCUMENTS

| | | | | |
|---|---|---|---|---|
| 5,313,387 | A | * | 5/1994 | McKeeman et al. .......... 700/90 |
| 5,854,932 | A | * | 12/1998 | Mariani et al. ............. 717/116 |
| 5,905,892 | A | * | 5/1999 | Nielsen et al. .............. 717/145 |
| 5,974,256 | A | | 10/1999 | Matthews et al. .......... 395/705 |
| 6,014,138 | A | * | 1/2000 | Cain et al. .................. 345/335 |
| 6,053,951 | A | | 4/2000 | McDonald et al. ............ 717/1 |
| 6,161,196 | A | | 12/2000 | Tsai ............................ 714/10 |
| 6,237,135 | B1 | | 5/2001 | Timbol .......................... 717/1 |
| 6,263,339 | B1 | | 7/2001 | Hirsch ........................ 707/102 |
| 6,269,475 | B1 | | 7/2001 | Farrell et al. ................. 717/2 |

(Continued)

OTHER PUBLICATIONS

Kaur et al., "Visualization in Java, the performance of Control System, based on Fuzzy Inference System, with a front-end built in Visual Baisc," IFSA World Congress and 20th NAFIPS Intl. Conf., Joint vol. 2, pp. 1092-1097 (2001).

(Continued)

*Primary Examiner*—Meng-Al T. An
*Assistant Examiner*—Jason Mitchell
(74) *Attorney, Agent, or Firm*—Synnestvedt & Lechner LLP

(57) ABSTRACT

A fault-tolerant method of bottom-up editing whereby simultaneous display of the GUI view and source code view are available, and wherein real-time bottom-up editing is provided. In accordance with a preferred embodiment of the present invention, changes to the source code are isolated, first by isolating and analyzing source code according to groupings associated with the structure of the language used for the source code and then isolating and analyzing individual lines of source code within these groupings. If there are no errors in a particular grouping of source code, the changes in the grouping are automatically applied to the GUI. If errors are found in a grouping, the grouping is further analyzed to determine which lines contain the error. Semantic and syntactic errors are thereby isolated and, where found, are ignored. However, correct lines of the source code are also identified and thereby applied to the GUI for interpretation and display. Thus, correct edits to the source code are displayed in real-time while errors are ignored.

3 Claims, 11 Drawing Sheets

U.S. PATENT DOCUMENTS

| | | | | |
|---|---|---|---|---|
| 6,301,585 | B1* | 10/2001 | Milne | 707/103 R |
| 6,305,008 | B1* | 10/2001 | Vaidyanathan et al. | 717/111 |
| 6,353,925 | B1* | 3/2002 | Stata et al. | 717/112 |
| 6,367,068 | B1* | 4/2002 | Vaidyanathan et al. | 717/143 |
| 6,370,654 | B1 | 4/2002 | Law, Jr. et al. | 714/4 |
| 6,385,765 | B1 | 5/2002 | Cleaveland et al. | 717/8 |
| 6,421,739 | B1 | 7/2002 | Holiday | 709/330 |
| 6,687,896 | B1* | 2/2004 | Royce et al. | 717/141 |
| 6,961,874 | B2* | 11/2005 | Lodrige | 714/39 |
| 7,058,955 | B2* | 6/2006 | Porkka | 719/314 |
| 2002/0032900 | A1 | 3/2002 | Charisius et al. | 717/2 |
| 2002/0083413 | A1 | 6/2002 | Kodosky et al. | 717/109 |
| 2002/0104071 | A1 | 8/2002 | Charisius et al. | 717/109 |
| 2003/0131342 | A1* | 7/2003 | Bates et al. | 717/124 |
| 2004/0003335 | A1* | 1/2004 | Gertz et al. | 714/758 |
| 2004/0031017 | A1* | 2/2004 | Vaidyanathan et al. | 717/110 |

OTHER PUBLICATIONS

Abelo et al., "Visualizing Massive Multi-Digraphs," Information Visualization Research, Shannon Laboratories, AT&T Labs-Research, pp. 39-47 (2000).

Risley et al., "Visualization of Compile Time Errors in a Java Compatible Visual Language," Proceedings 1998 IEEE Symposium on Visual Languages, pp. 22-29 (1998).

* cited by examiner

```
1.   public class Empty {
2.        private javax.swing.JButton jButton = null;
3.        private javax.swing.JButton jButton1 = null;
4.        private javax.swing.JButton getJButton() {
5.            if(jButton == null) {
6.                jButton = new javax.swing.JButton();
7.                jButton.setSize(183, 158);
8.                jButton.setBackground(java.awt.Color.red);
9.            }
10.           return jButton;
11.       }
12.       private javax.swing.JButton getJButton1() {
13.           if(jButton1 == null) {
14.               jButton1 = new javax.swing.JButton();
15.               jButton1.setSize(186, 161);
16.               jButton1.setBackground(java.awt.Color.blue);
17.           }
18.           return jButton1;
19.       }
20.  }
```

Figure 1

```
1.   public class Empty {
2.       private javax.swing.JButton jButton = null;
3.       private javax.swing.JButton jButton1 = null;
4.       private javax.swing.JButton getJButton() {
5.           if(jButton == null) {
6.               jButton = new javax.swing.JButton();
7.               jButton.setSize(183, 158);
8.               jButton.setBackground(java.awt.Color.green);
9.           }
10.          return jButton;
11.      }
12.      private javax.swing.JButton getJButton1() {
13.          if(jButton1 == null) {
14.              jButton1 = new javax.swing.JButton();
15.              jButton1.setSize(186, 161);
16.              jButton1.setBackground(java.awt.Color.blue);
17.          }
18.          return jButton1;
19.      }
20.  }
```

Figure 3

```
1.   public class Empty {
2.       private javax.swing.JButton jButton = null;
3.       private javax.swing.JButton jButton1 = null;
4.       private javax.swing.JButton getJButton() {
5.           if(jButton == null) {
6.               jButton = new javax.swing.JButton();
7.               jButton.setSize(186, 158);
8.               jButton.setBackground(java.awt.Color.green);
9.           }
10.          return jButton;
11.      }
12.      private javax.swing.JButton getJButton1() {
13.      }
14.  }
```

Figure 4

```
1.   public class Empty {
2.       private javax.swing.JButton jButton = null;
3.       private javax.swing.JButton jButton1 = null;
4.       private javax.swing.JButton getJButton() {
5.           if(jButton == null) {
6.               jButton = new javax.swing.JButton();
7.               jButton.setSize(183, 158);
8.               jButton.setBackground(    );
9.           }
10.          return jButton;
11.      }
12.      private javax.swing.JButton getJButton1() {
13.          if(jButton1 == null) {
14.              jButton1 = new javax.swing.JButton();
15.              jButton1.setSize(186, 161);
16.              jButton1.setBackground(java.awt.Color.blue);
17.          }
18.          return jButton1;
19.      }
20.  }
```

Figure 6

```
1.   public class Empty {
2.       private javax.swing.JButton jButton = null;
3.       private javax.swing.JButton jButton1 = null;
4.       private javax.swing.JButton getJButton() {
5.           if(jButton == null) {
6.               jButton = new javax.swing.JButton();
7.               jButton.setSize(183, 158);
8.               jButton.setBackground(    );
9.           }
10.          return jButton;
11.      }
12.      private javax.swing.JButton getJButton1() {
13.      }
14.  }
```

Figure 7

```
1.   public class Empty {
2.        private javax.swing.JButton jButton = null;
3.        private javax.swing.JButton jButton1 = null;
4.        private javax.swing.JButton getJButton() {
5.             jButton = new javax.swing.JButton();
6.             return jButton;
7.        }
8.        private javax.swing.JButton getJButton1() {
9.             return null;
10.       }
11.  }
```

Figure 8

```
1.   public class Empty {
2.        private javax.swing.JButton jButton = null;
3.        private javax.swing.JButton jButton1 = null;
4.        private javax.swing.JButton getJButton() {
5.             jButton.setSize(183, 158);
6.             return jButton;
7.        }
8.        private javax.swing.JButton getJButton1() {
9.             return null;
10.       }
11.  }
```

Figure 9

```
1.   public class Empty {
2.        private javax.swing.JButton jButton = null;
3.        private javax.swing.JButton jButton1 = null;
4.        private javax.swing.JButton getJButton() {
5.             jButton.setBackground(   );
6.             return jButton;
7.        }
8.        private javax.swing.JButton getJButton1() {
9.             return null;
10.       }
11.  }
```

Figure 10

```
1.   public class Empty {
2.        private javax.swing.JButton jButton = null;
3.        private javax.swing.JButton jButton1 = null;
4.        private javax.swing.JButton getJButton() {
5.            if(jButton == null) {
6.                 jButton = new javax.swing.JButton();
7.                 jButton.setSize(183, 158);
8.
9.
10.
11.           }
12.           return jButton;
13.       }
14.       private javax.swing.JButton getJButton1() {
15.       }
16. }
```

Figure 11

```
1.  public class Empty {
2.      private javax.swing.JButton jButton = null;
3.      private javax.swing.JButton jButton1 = null;
4.      private javax.swing.JButton getJButton() {
5.          if(jButton == null) {
6.              jButton = new javax.swing.JButton();
7.              jButton.setSize(183, 158);
8.              jButton.setBack
9.
10.
11.     }
12.     private javax.swing.JButton getJButton1() {
13.         if(jButton1 == null) {
14.             jButton1 = new javax.swing.JButton();
15.             jButton1.setSize(186, 161);
16.             jButton1.setBackground(java.awt.Color.blue);
17.         }
18.         return jButton1;
19.     }
20. }
```

Figure 13

FAULT-TOLERANT DYNAMIC EDITING OF GUI DISPLAY AND SOURCE CODE

BACKGROUND OF THE INVENTION

1. Field of the Invention

The present invention relates to data processing systems and more particularly, to fault-tolerant simultaneous dynamic graphical and source code editing.

2. Description of the Related Art

In recent years, virtually all personal computers and workstations have adopted a graphical user interface (GUI) environment, which allows the user to manage the system and execute applications using a "point-and-click" method on objects shown on the computer display. The main GUI background is commonly referred to as the "desktop", and these objects typically include graphic icons, which represent some software application or function, and windows, which divide the desktop into different areas on the display for different applications.

As is well known, computer instructions are written in source code. Although a skilled programmer can understand source code to determine what the code is designed to accomplish, a graphical representation or model of the source code, displayed on the GUI, helps to organize and visualize the structure and components of the software system. The source code "instructs" the GUI regarding what to display. For example, specific source code entries will define an image of a button to be displayed, the color of the button, text to be included within the button, the size of the text, and the like.

Developing a software program involves a continual "write-and-edit" process, whereby a software developer will try out different color schemes, image displays, layouts, and other visual-related aspects of the GUI. To make this process easier, editing tools ("editors") were developed. Early editors allowed the developer to toggle between the "source code window" (essentially a text editor) and the "GUI window" (a window displaying an editable graphical interpretation of the source code), and required the developer to "refresh" the view that was not being used for the "active editing". For example, a developer could open the source code window as the active-editing window and would be given read-and-write access to the source code. The developer could then edit the source code to change the GUI's interpretation of the code (e.g., add code to instruct the GUI to display additional objects; modify existing code to instruct the GUI to change a background color; etc.). Once the edits were complete, the developer could then toggle to the GUI window, click on a "refresh" button, and the GUI would attempt to interpret the new source code and display the images associated therewith. If errors existed in the source code, error codes would be generated. In the presence of errors in the source code, some prior art systems deny access to the GUI unless the error in the source code is corrected. In other systems, the GUI is completely blanked out, or an error icon is placed in the GUI forcing the user to go to the source to correct it before it can be displayed/accessed.

Editors exist that allow "GUI-to-source" editing, that is, editing in the GUI window, with the edits being reflected in the source code. Editors also exist that allow "source-to-GUI" editing, that is editing in the source code window, with the edits being applied to the view displayed by the GUI. GUI-to-source editing is sometimes referred to as "top-down" editing; editing from source-to-GUI is sometimes referred to as "bottom-up" editing. Typically, top-down editing is less complex and generates fewer errors, since the changes made in the GUI window can only be made if they are correct. For example, to change the background color of an object in a GUI window, the editor may allow the object to be "right-clicked" to generate a menu of available colors, from which a color is then selected by clicking on the desired color. Code is inserted into the source code file to effect the change. This leaves little room for error, as the changes are selected from a list of acceptable options.

Bottom-up editing is more complex, since source code is in text form and can consist of anything that can be input from a keyboard. Thus, for example, a developer may fail to insert required control codes that are necessary for the language being used (and thus necessary for the GUI to be able to interpret the text), and misspellings and other typographical errors can easily make it into the source code. When the GUI tries to interpret this incorrect source code, errors are generated which can cause the system to disregard all changes, or even crash. Obviously, neither of these options are acceptable.

More recently, "split-screen" editors have been developed that allow the software developer to view both the GUI editing window and the source code editing window simultaneously. In some cases (see for example, U.S. Patent Application Publication No. US-2002-0104071) changes made are synchronized so that a modification in one of the windows is automatically reflected in the other. Thus, using these systems, when a developer makes an accurate edit in the GUI window (top-down editing) the source code is modified automatically. Similarly, when a developer makes an accurate change to the source code via the source code window (bottom-up editing), the change in the source code is automatically interpreted and displayed by the GUI.

While easing a software developer's ability to edit source code/GUI documents, such systems are not without problems. For example, when performing bottom-up editing, the prior-art systems do not tolerate faults or errors in the source code, particularly when the source code is in a high level language, such as JAVA, which requires parsers and compilers to be properly interpreted. If the developer inserts an edit to JAVA source code which is in an improper syntax (e.g., it does not incorporate appropriate JAVA syntax), when the automatic refresh cycle occurs, the GUI window cannot be updated and an error indication is generated. Similar problems occur with semantic errors. In addition, if the developer pauses the input of edits for a time longer than the threshold for the refresh cycle, the system will try to refresh without a complete edit, which can also cause errors. Thus, the developer is required to make all updates quickly and accurately, and cannot see the results of correctly-made changes until any inaccurate edits are corrected.

Accordingly, it would be desirable to have a fault-tolerant editing system that can update the GUI view based on source code edits in such a manner that correct edits are implemented and displayed and incomplete or incorrect edits are ignored.

SUMMARY OF THE INVENTION

The present invention is a fault-tolerant method of bottom-up editing whereby simultaneous display of the GUI view and source code view are available, and wherein real-time bottom-up editing is provided. In accordance with a preferred embodiment of the present invention, changes to the source code are isolated, first by isolating and analyzing source code according to groupings associated with the structure of the language used for the source code (e.g., by creating and analyzing one or more "group-level snippet" documents), and then isolating and analyzing individual lines of source code within these groupings (e.g., by creating and analyzing "singles-statement level" documents). If there are no errors in a particular grouping of source code, the changes in the grouping are automatically applied to the GUI. If errors are found in a grouping, the grouping is further analyzed to determine which lines contain the error. Semantic and syntactic errors are thereby isolated and, where found, are ignored. However, correct lines of the source code are also identified and thereby applied to the GUI for interpretation and display. Thus, correct edits to the source code are displayed in real-time while errors are ignored.

BRIEF DESCRIPTION OF THE DRAWINGS

FIG. 1 illustrates an example of typical JAVA source code as it would be viewed in a source code text editor;

FIG. 3 illustrates an example source code containing a correct edit;

FIG. 4 illustrates a first level of source code isolation performed in accordance with the present invention;

FIG. 6 illustrates an example of source code containing a semantic error;

FIG. 7 illustrates a first level of source code isolation of source code illustrated in FIG. 6;

FIGS. 8-10 illustrate single-statement level documents corresponding to the first level isolation illustrated in FIG. 7;

FIG. 11 illustrates the edited method illustrated in FIG. 7, but with the JAVA statement containing the error omitted;

FIG. 13 shows an example of source code containing a syntax error that will affect parsing, rather than a semantic error, which will affect compiling;

DETAILED DESCRIPTION OF THE PREFERRED EMBODIMENTS

FIG. 1 illustrates an example of typical JAVA source code as it would be viewed in a source code text editor. The numbers along the left side are provided to assist in identification of specific lines for the purpose of this discussion; it is understood that in typical source code, these numbers are not provided.

Referring to FIG. 1, twenty text lines of JAVA code are illustrated. As can be seen, the JAVA code comprises a series of words/letter strings and various symbols, (e.g., "; ", "( )", "{ }", etc.). The word/letter strings define the semantic aspects of the code, and the symbols are related to the syntax of the code. For example, each statement of JAVA code ends with a ";". This is an example of JAVA syntax. In text line 8, the text "java.awt.Color.red" between parenthesis "tells" a GUI to set a background (in this case, the background of an image called "JButton") to be the color red. This is semantically correct in JAVA.

It can easily be seen how errors in coding can occur. For example, failure to place a ";" at the end of a JAVA statement, or failure to use parenthesis around certain text, are syntax errors, since the code will not be "understood" by the GUI as being JAVA code. Similarly, if, instead of putting the word "red" in text line 8, the programmer mistyped and put the letters "rtd", a semantic error will occur, meaning that, while the GUI will recognize the code as being JAVA code, it will not know what to do when instructed to set the background for "JButton" to "rtd".

Figure 2:
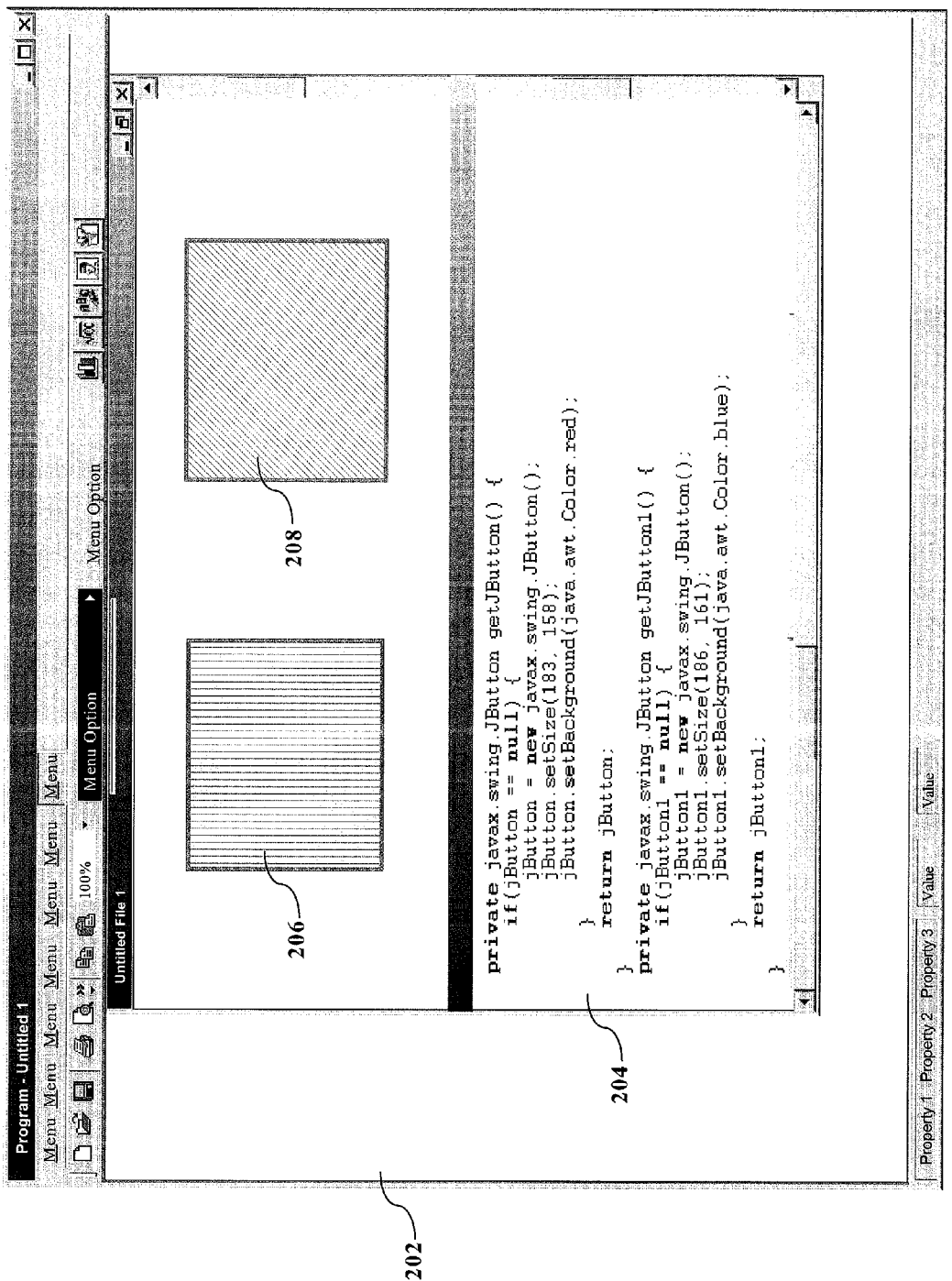
FIG. 2 shows the view of the code of FIG. 1 displayed using a split-screen editor.

The code illustrated in FIG. 1 does not contain any errors. FIG. 2 shows the view of the code of FIG. 1 displayed using a split-screen editor. As can be seen, two square buttons are defined in the GUI window 202. For the purposes of this example, the button 206 is named "JButton" and button 208 is named "JButton1". In the source code window 204, portions of the source code that define the buttons displayed in GUI view 202 are shown. Both the source code window 204 and the GUI window 202 are scrollable. Thus, while the source code illustrated in source code window 204 corresponds to the source code illustrated in FIG. 1, it can be seen that, in the source code window 204 of FIG. 2, the first three text lines and text line 20 of FIG. 1 are not displayed. It is understood that, by scrolling the view in source code window 204, these text lines would be viewable.

As can be seen, JButton 206 is identified as having a red background, as defined by the source code "jButton.setBackground(java.awt.Color.red);", and JButton1 208 is defined as having a blue color ("jButton1.setBackground (java.awt.Color.blue);". For the purposes of this example, the GUI window view uses horizontal lines inside JButton 206 to illustrate the color red, and uses diagonal top-right-to-bottom-left-going lines in JButton1 208 to represent the color blue.

Referring now to FIG. 3, an example of a correct edit is shown. As can be seen, in FIG. 3, text line 8, the color has been changed from red to green. All of the appropriate symbols are included so the syntax is still correct, and the term "green" is understood by the GUI and thus represents a proper semantic term. Therefore, the GUI will change the background color of Jbutton 208 to the color green.

As mentioned above, in early prior art systems, to be able to see the change effected in the GUI, the developer would have to click a "refresh" button to cause the GUI to parse and compile the change in a known manner. In newer systems incorporating automatic updating, as long as the developer deleted the letters "red" and typed in the letters "green" correctly and without significant delay, the GUI, which automatically updates after a period of time of inactivity (e.g., one second without a keystroke), will properly show the update on the next refresh cycle. However, if, for example, the developer started typing the letters "gre" and then stopped for a period exceeding the threshold delay, the prior art GUI would try to automatically refresh, would see the letters "gre", and generate a compiling (semantic) error, since the GUI would not know what "gre" meant. This could cause the whole system to crash or to generate an error, which would not allow any update, correct or not, to be displayed.

The present invention solves this problem by isolating a portion of the text that contains a change, and then, within that isolated portion, checking for errors, first as a whole and then, if errors are indicated, on a line-by-line basis. If an error in one line is found, the line is simply ignored, while the remaining correct lines are interpreted by the GUI.

The source code of FIGS. 1-3 shows two source code groupings, in this example, two JAVA "methods". The first method, "getJButton", begins at text line 4 of FIG. 3 and ends at text line 11. The second method is called "getJButton1" and begins at text line 12 of FIG. 3 and ends at text line 19. Methods are one example of source code groupings; it is understood that practitioners in the field of software design and development can use and identify numerous other logical groupings of source code a "source code groupings" in the context of the present invention.

FIG. 4 illustrates a first level of isolation performed in accordance with the present invention, using a "group-level snippet" document. In this example, a single method, getJButton, is isolated by "snipping" the source code needed to be able to parse the method, thereby creating the group-level snippet document. This isolates the method getJbutton, which is the method that contains the change. Since there are no changes in the second method (getJButton1), there is no need for the system to isolate the second method for consideration. The creation of the group-level snippet document is described in more detail below.

Figure 5:
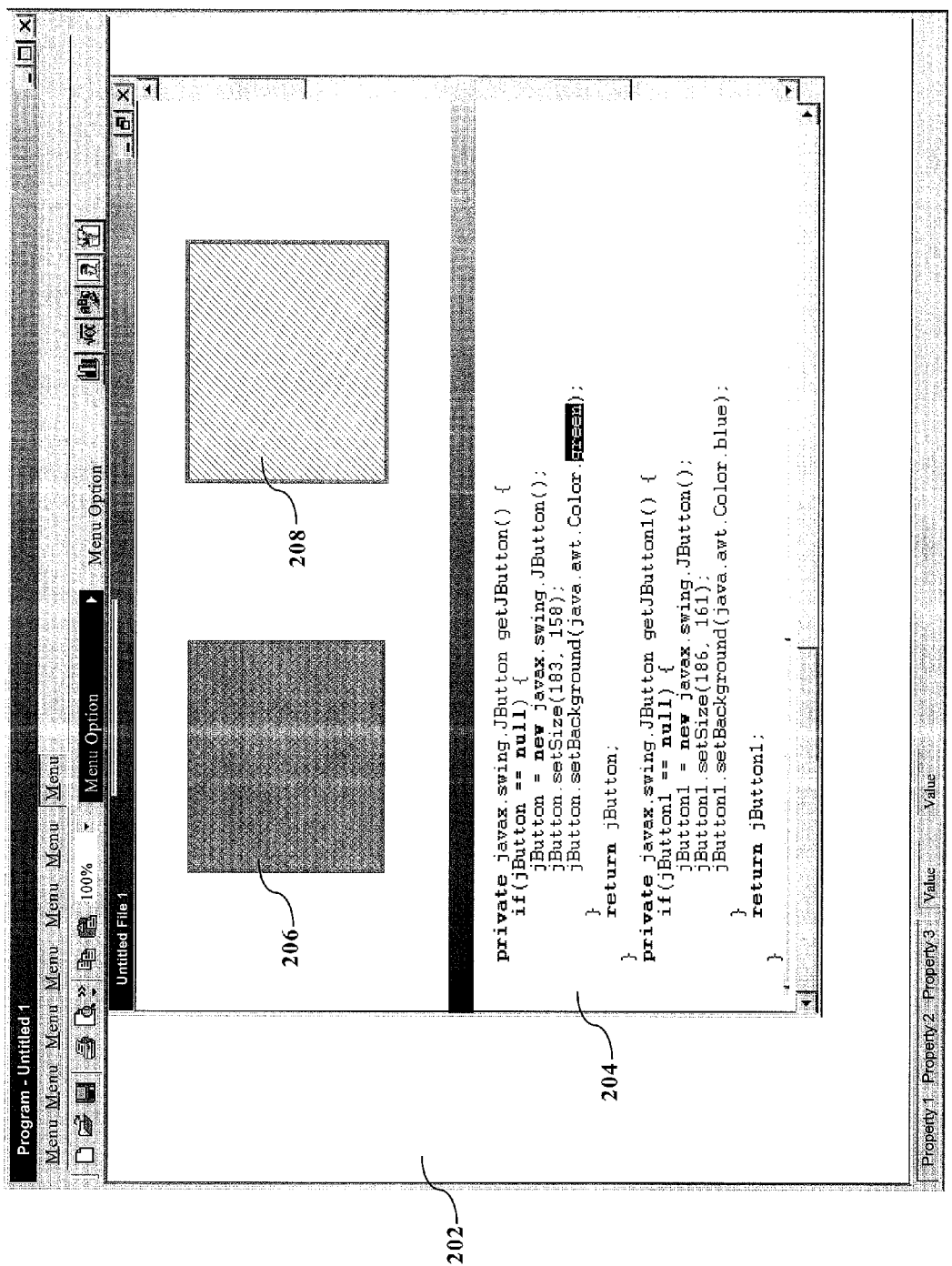
FIG. 5 is a split-screen editor view of the change resulting from the edit illustrated in FIGS. 3 and 4.

FIG. 5 is a split-screen editor view of the change resulting from the edit illustrated in FIGS. 3 and 4. Specifically, JButton 206 now has cross-hatched lines, indicating the change of the word from "red" to "green", which change is evident in the source code window 204. While the text "green" is highlighted for ease of understanding, it is understood that the changes are not actually highlighted in actual use of the system.

FIG. 6 illustrates an example of a semantic error. In this example, in line 8, the text between the parenthesis has been removed, with nothing inserted in its place. Thus, while the code will be properly interpreted by the GUI as being JAVA code, (and thus be parsable), it will not know what to do with a parsable command telling it to set the background color, since no direction is given as to what color to use. In this case, the code will not be compilable because of the semantic error.

In prior art systems, this would result in an error message being generated, thereby disabling the GUI, or completely blanking out the GUI and asking the user to correct the source code to view the GUI again. However, in accordance with the present invention, first the method containing the change is isolated (as shown in FIG. 7). To accomplish this, the Original Source Code (OSC) document is copied, and the edits to be made are performed on the copy, thereby creating an Edited Source Code (ESC) document. The ESC is then compared with the OSC document. Any source code groupings containing changes (e.g., any methods containing changes in this example) are isolated and snipped (i.e., "cut-and-pasted") into a separate source code file, generically referred to as a Delta Source-Code Snippet (DSCS) document (the term "document" as used herein identifies a computer readable file or other means of storing and/or displaying source code).

As illustrated in FIG. 7, the first isolation step isolates a portion of the source code. In the example of FIG. 7, a particular snippet of source code containing a JAVA method is isolated and saved in the DSCS document. The snippet of code in the DSCS document contains only the minimal necessary code needed to construct a correctly structured source code file that the parsers and compilers can work with. Thus, for example, the first three text lines of FIG. 7 are JAVA fields that must be included to enable the parsers and compilers to correctly process the snippet.

Next, statement-by-statement isolation of the DSCS document is performed, by creating a single-statement snippet document, in this case, a "single-statement DSCS" document. Referring to FIGS. 8-10, in accordance with the present invention, the three JAVA statements that affect the design of the image displayed by the GUI (text lines 6-8 of FIG. 7) are shown as being isolated. Referring to FIG. 8, the minimum necessary code to construct a correctly structured source code file, that is text lines 1-4 and 6-11, are shown; text line 5 of FIG. 8 corresponds to text line 6 of FIG. 7. Note that text lines 7 and 8 of FIG. 7 are not included in FIG. 8. This process isolates the JAVA statement in text line 5 so that it can be compiled and parsed individually to see if any errors exist. Since text line 5 of FIG. 8 contains no errors, it is determined upon compiling and parsing that it is correct code.

Next, the process proceeds to the source code of FIG. 9, which is identical to that of FIG. 8 except for text line 5. As can be seen, text line 5 is now the second of the three significant JAVA statements of FIG. 7. As with FIG. 8, when the code of FIG. 9 is parsed and compiled, no errors are found and thus this JAVA statement is identified as being acceptable for compiling and parsing by the GUI.

Figure 12:
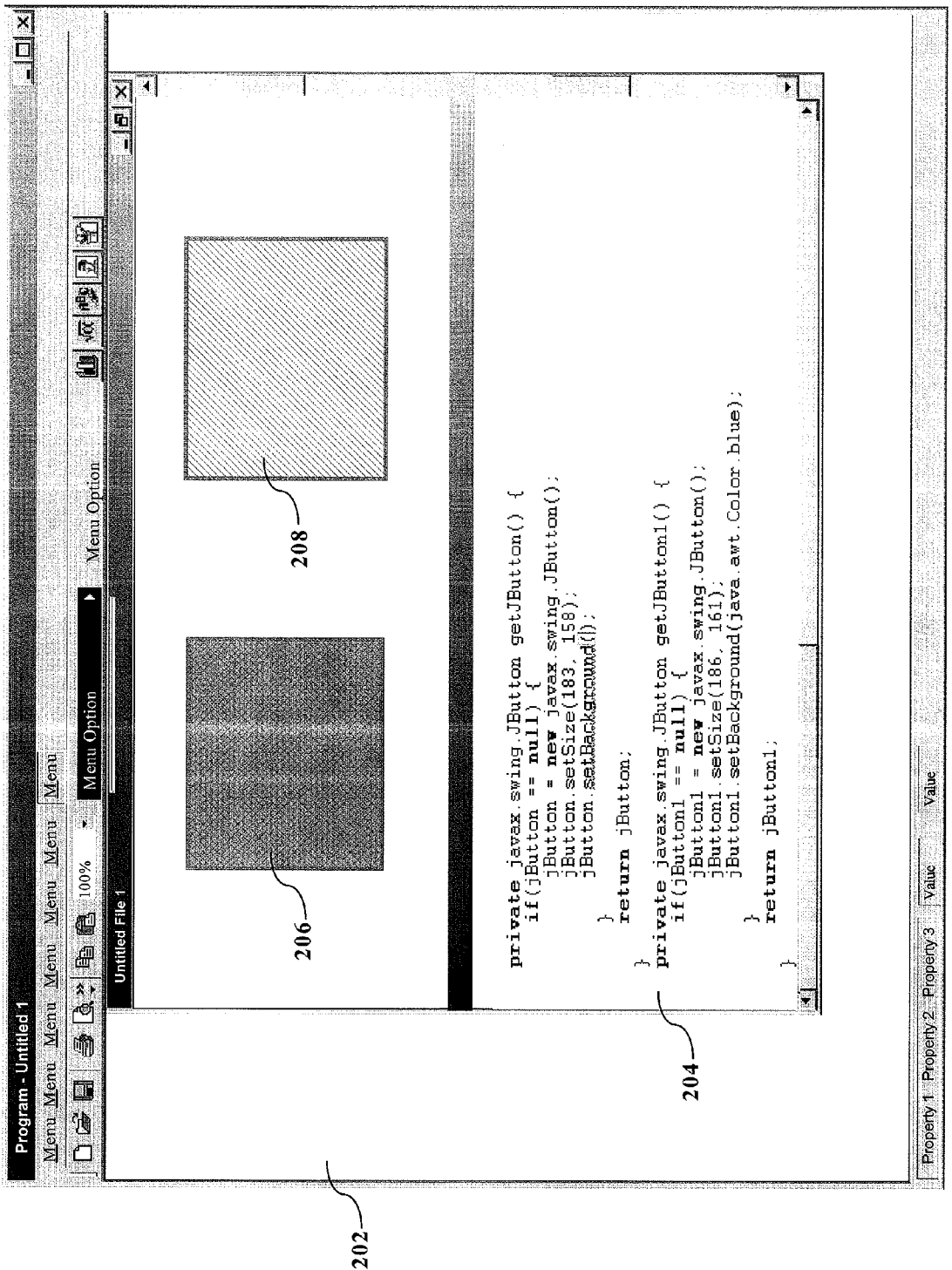
FIG. 12 illustrates the display of the method illustrated in FIG. 11 in the GUI window.

FIG. 10 is identical to FIGS. 8 and 9, with the exception of line 5, which now contains the third JAVA statement containing important design code. In this case, the JAVA statement in text line 5 contains the semantic error described above, that is, no text is contained within the parenthesis. Upon attempting to compile and parse this code, a compile error will be generated, indicating that an error exists in this JAVA statement. Thus, as shown in FIG. 11, the method illustrated in FIG. 7 is recreated, but with the JAVA statement containing the error omitted. The entire method, without the statement containing the errors, replaces the same method in the OSC (or, in the case of an edit that adds a new method, is inserted into the OSC at the appropriate location), thereby modifying the OSC to incorporate only the parsable, compilable statement. This method is then used to update the GUI. In this case, since there is no color change properly indicated in the source code, as shown in FIG. 12, there is no change in the GUI displayed in the GUI window 204; it simply remains the color that it was prior to the attempted change. Thus, rather than generating an error message or crashing the editing program, the GUI remains displayed in its previous state. If the method had contained both an accurate change and an inaccurate change (e.g., if the setSize parameter had been correctly changed), the image displayed in GUI window 204 would have shown the change in size but would not have reflected the change in color.

Figure 14:
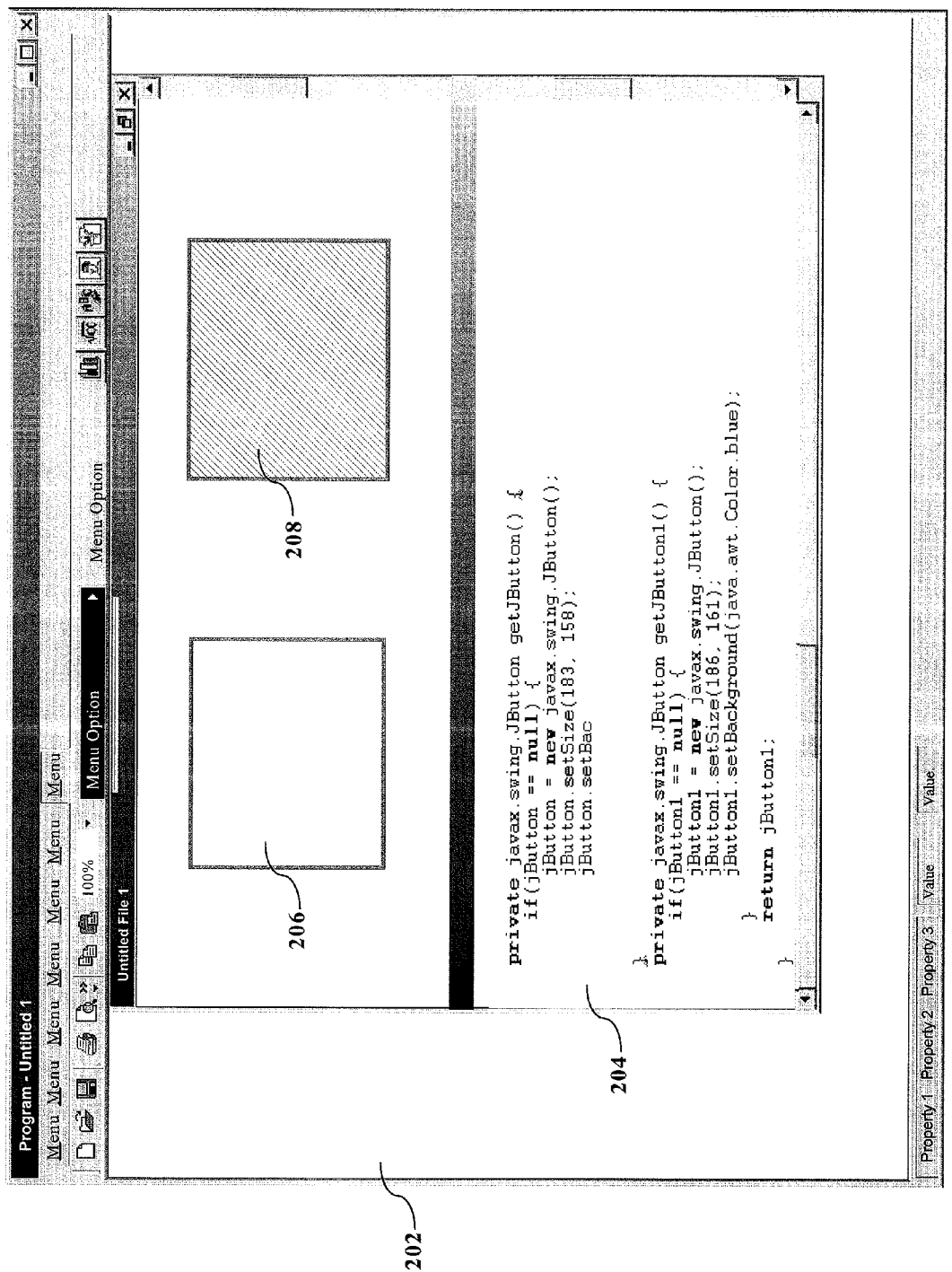
FIG. 14 is a split-screen editor view of an editing window displaying the source code illustrated in FIG. 13.

FIG. 13 shows an example of a syntax error that will affect parsing, rather than a semantic error, which will affect compiling, and FIG. 14 is a split-screen editor view of an editing window displaying the source code illustrated in FIG. 13. Referring to FIGS. 13 and 14, all text lines are identical to those of FIG. 6, except that, in text line 8, a portion of the correct JAVA statement has been deleted, thus removing control characters used by JAVA, including the ";" that goes at the end of each JAVA statement and a "}" which is used to group certain statements together. Thus, a parser trying to read this code will not recognize it as JAVA code. In accordance with the present invention, when a parsing error is detected, all JAVA statements that are parsable are used, and any unparsable statements are treated as a nullity, i.e., they are deleted from the original source code. Thus, as can be seen in the GUI window 204, the background image changed to have no color. This is done because a parse error is a much more serious problem and there is a higher probability that the property itself was being changed, instead of only its value—and hence a complete removal of the unparseable text is warranted.

Thus, using the present invention, lines containing compiling errors are ignored and lines containing parsing errors are entirely removed, and the GUI processes only the correct lines of code.

Figure 15:
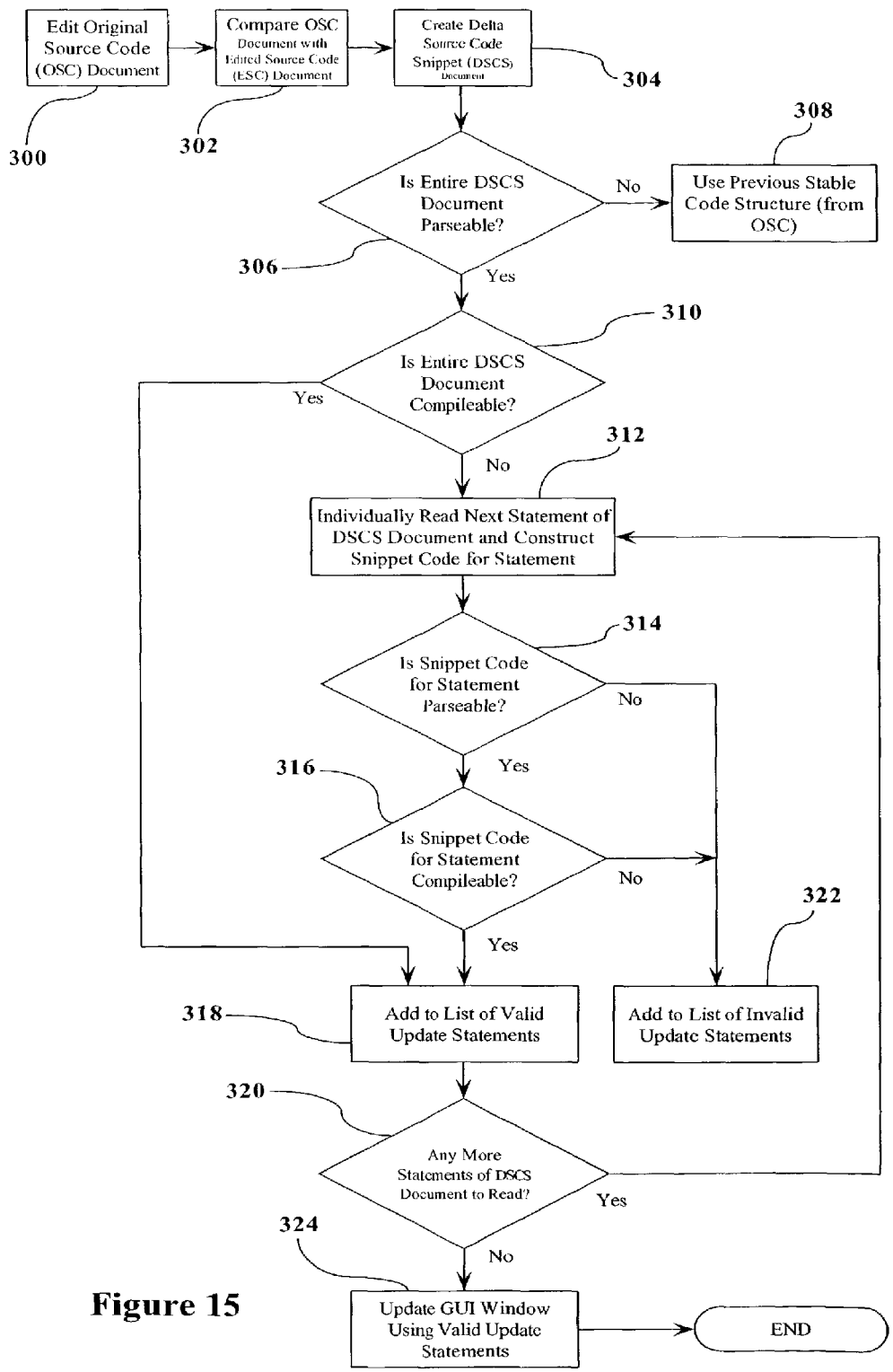
FIG. 15 is a flowchart illustrating the steps performed in accordance with the present invention.

FIG. 15 is a flowchart illustrating the steps performed in accordance with a preferred embodiment of the present invention. Referring to FIG. 15, at step 300, an original source code (OSC) document is edited. At step 302, the OSC document is compared with the edited source code (ESC) document, and at step 304, a delta source code snippet (DSCS) document is created. Creation of snippet documents generally is a well known process and the details of the process for performing snippet creation is not discussed further herein.

At step 306, a determination is made as to whether or not the DSCS document, in its entirety, is parsable. For example, the DSCS document is run through a JAVA parser and monitored for errors. If at step 306, it is determined that the entire DSCS document is not parsable, then at step 308, the statements of the DSCS document that are unparsable are retained in the corresponding portion of the OSC document, and all other statements in the DSCS document (i.e., the unparsable statements) are removed (or never added to) the corresponding portion of the OSC document. This retains previously stable code structure and ignores unstable code structure.

If, at step 306, it is determined that the entire DSCS document is parsable, then at step 310, a determination is made as to whether or not the entire DSCS document is compilable. The DSCS document is run through a JAVA compiler, and monitored for errors. If at step 310 it is determined that the entire DSCS document is compilable, the process flows directly to step 318, and the DSCS document, and all of the statements contained therein, are added to the list of valid update statements that is saved for use in modifying the master (original) source code document.

If at step 310 it is determined that the entire DSCS document is not compilable, then at step 312, the next relevant statement of the DSCS document is read individually and a single-statement DSCS document is created. As discussed above, this document does not actually contain only a single statement, but instead focuses on, or isolates, a single statement at a time of the DSCS document for analysis.

Once the single-statement DSCS document is constructed, at step 314, a determination can be made as to whether or not the single statement-of-interest within that document is parsable. It is noted that this step is unnecessary and is included as a "double check" only. It is unnecessary because if, at step 306, it is determined that the entire document was parsable, there should not be any individual statements that are unparsable. If, however, the statement is not parsable, the statement is added to a list of invalid update statements at step 322. This list of invalid update statements contains a list of the statements that are determined to be invalid, and these statements are not included in the final update to the GUI window.

If at step 314 it is determined that the single-statement DSCS document is parsable (or if step 314 is excluded altogether), then at step 316, the single-statement DSCS document is checked to see if the statement-of-interest is compilable. If, at step 316, it is determined that the statement-of-interest is not compilable, then the process proceeds to step 322 and the statement is added to the list of invalid update statements.

However, if at step 316, it is determined that the single-statement DSCS document is compilable, then at step 318, the statement is added to the list of valid update statements that will be used to modify the OSC. At step 320, a determination is made as to whether any more statements are available for reading in the DSCS document. If there are, the process proceeds back to step 312, and the previously-described steps are performed on the next statement.

If, however, it is determined that at step 320, there are no more statements of the DSCS document to be read, then the OSC is updated with all of the valid updates and at step 324, the GUI window is updated using the modified (updated) OSC document, and the process is completed.

In addition to the benefits described above, the method of the present invention results in the ability to isolate problems in the source code so that editing can continue in unaffected regions. This is of great importance to editors of source code, since source code, particularly during development of a program, is in a constant state of flux.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a workstation being used by the developer doing the editing. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, FIGS. 1-15 support combinations of means for performing the specified functions, combinations of steps for performing the specified functions, and program instruction means for performing the specified functions.

Although the present invention has been described with respect to a specific preferred embodiment thereof, various changes and modifications may be suggested to one skilled in the art. For example, instead of creating an ESC document and then a DSCS document as described herein, a group-level snippet document can be systematically created for each source code grouping in the OSC document, one grouping at a time, without first isolating source code grouping that have had changes made to them. This will allow an OSC document to be checked for errors, even if no changes have been made to it. Similarly, the ESC document can be checked without creating a DSCS document, and any edited source code grouping that contains an error can just be disregarded in its entirety, without isolating the particular statement within the grouping that contains the error. It is intended that the present invention encompass such changes and modifications as fall within the scope of the appended claims.

We claim:

1. A fault-tolerant method for editing an Original Source Code (OSC) document, said OSC document being structured into one or more source code groupings containing one or more statements, comprising the steps of:

creating an Edited Source Code (ESC) document by editing a copy of said OSC document;

comparing said OSC document with said ESC document to identify any source code groupings containing edits;

creating a Delta Source Code Snippet (DSCS) document based on said identified source code groupings;

parsing said DSCS document;

identifying any unparseable statements in said DSCS document;

if any statements of said DSCS document are unparseable, modifying said OSC document so as to incorporate only the parseable statements in said DSCS document;

compiling said DSCS document if said DSCS document includes parseable statements;

if all of the statements of said DSCS document are compilable, updating said OSC document with said statements in said DSCS document;

if all of the statements of said DSCS document are not compilable, identifying any uncompilable statements of said DSCS document; and modifying said OSC document so as to incorporate only compilable statements in said DSCS document.

2. The method of claim 1, wherein said step of identifying any uncompilable statements of said DSCS document comprises at least the steps of:

creating a single-statement level snippet document for each statement in said DSCS document; and compiling each single-statement level snippet document so as to identify any of said statements that are uncompilable.

3. The method of claim 2, wherein said OSC document is interpretable by a Graphic User Interface (GUI) to display a GUI view in a window of said GUI, further comprising the step of:

refreshing said GUI view using said updated OSC document after said OSC document has been modified.

* * * * *